Figure 1:
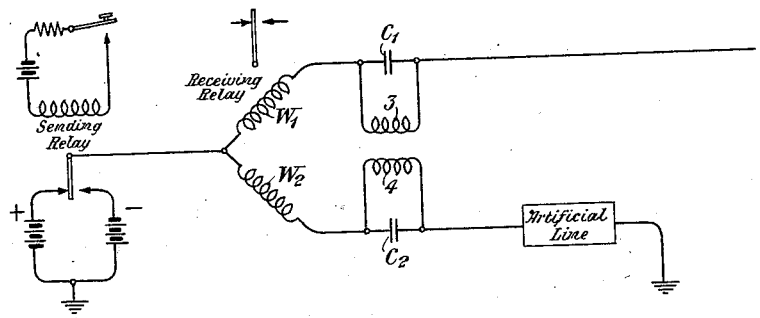

April 10, 1928.

S. I. CORY 1,665,297

GROUNDED DUPLEX TELEGRAPH SYSTEM

Filed June 26, 1926

INVENTOR
S. I. Cory
BY
ATTORNEY

Patented Apr. 10, 1928.

1,665,297

UNITED STATES PATENT OFFICE.

SAMUEL I. CORY, OF TOWACO, NEW JERSEY, ASSIGNOR TO AMERICAN TELEPHONE AND TELEGRAPH COMPANY, A CORPORATION OF NEW YORK.

GROUNDED DUPLEX TELEGRAPH SYSTEM.

Application filed June 26, 1926. Serial No. 118,754.

This invention relates to grounded direct current telegraph systems, and more particularly to the duplex repeater circuits employed in such systems.

The object of the invention is to provide improved arrangements for reducing interference with telegraph systems from alternating current power transmission systems.

It has been the practice heretofore to employ resonant shunts connected across the receiving relay windings of telegraph systems of the class to which the invention relates. These shunt circuits are tuned to the frequency of the interfering power currents offering a low impedance to these currents and a high impedance to the signaling currents.

In accordance with the invention described hereinafter, I provide a novel circuit arrangement including anti-resonant elements.

In the use of anti-resonant arrangements resorted to heretofore, it has been necessary to employ separate inductances in the line and in the artificial line, and with such arrangements there is an undesirable effect on signals outgoing from the repeater.

The drawing shows as an illustration a differential duplex arrangement modified according to my invention. The circuit which is shown diagrammatically in Figure 1 of the drawing, and in a similar manner and a modified form in Fig. 2, includes as elements old and well understood in the art, a line, a balancing artificial line, a sending relay and a receiving relay having a winding $W_1$ in series with the line and a winding $W_2$ in series with the artificial line.

In the arrangement of Fig. 1, I make use of a transformer comprising a winding 3 and a winding 4. The windings 3 and 4 are connected differentially with respect to signals sent to the line by the sending relay of the system. Condensers $C_1$ and $C_2$ are connected across windings 3 and 4, respectively. The values of the capacity of the condenser $C_1$ and the capacity of the condenser $C_2$ should be large. Furthermore, the capacities, in combination with the windings, should offer high impedance, looking into the transformers, to the frequency of the interfering power current. With this arrangement, the series impedance introduced in the line by the anti-resonant elements will be small.

The chief advantage of the arrangement described above is the considerable reduction of the effect of the anti-resonant elements on both the outgoing and incoming telegraph signals.

Figure 2:
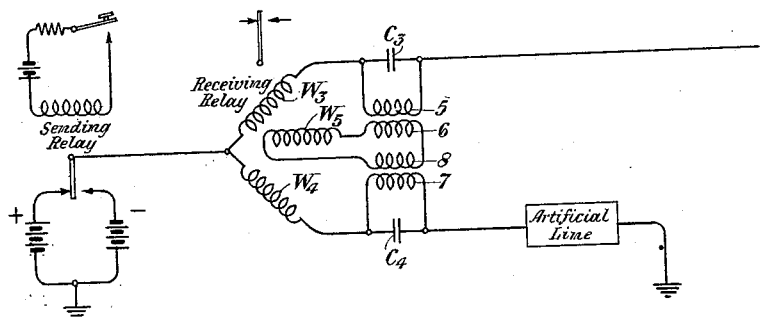

In a modified form of the circuit shown in Fig. 2, the receiving relay is shown with a first winding $W_3$ in series with the line, a second winding $W_4$ in series with the artificial line, and a third winding $W_5$. This third winding is associated with the transformer arrangement and the tuned circuits as follows: I provide two transformers, the primary winding 5 of the one transformer being associated with a condenser $C_3$ in the line, and the primary winding 7 of the second transformer being associated with a condenser $C_4$ in the artificial line. The secondary windings of the two transformers, 6 and 8, respectively, are connected in series with the winding $W_5$ of the receiving relay. The tuned circuits formed by the inductance looking into winding 5 of the first transformer and the condenser $C_3$ and the inductance looking into winding 7 of the second transformer and the condenser $C_4$, are so designed that there is little effect on either outgoing or incoming telegraph signals. It is to be noted that the primary windings 5 and 7 are connected differentially with respect to the outgoing signals. The interfering current flowing in the winding $W_5$ will be in such a direction as to neutralize the flow of interfering current in the relay windings $W_3$ and $W_4$. With proper proportions of the transformers and the winding $W_5$, the arrangement will afford substantially complete protection against interfering power currents of a given frequency and will have practically no effect on either incoming or outgoing telegraph signals.

What is claimed is:

1. In a duplex telegraph repeater system, a line, an artificial line, a sending relay, a receiving relay, a transformer arrangement associated with the line and the artificial line, a tuned circuit in the line anti-resonant at the frequencies of interfering currents, and a tuned circuit in the artificial line anti-resonant at said frequencies, each of said tuned circuits including as one of its elements one winding of said transformer arrangement.

2. In a duplex telegraph repeater system, a line, an artificial line, a sending relay, a receiving relay, a transformer, a first tuned circuit in the line including one winding of said transformer, and a second tuned circuit in the artificial line including the other winding of said transformer, said two windings of the transformer being connected differentially with respect to signals sent out by the sending relay, and said tuned circuits being anti-resonant at the frequencies of interfering currents.

3. In a duplex telegraph repeater system, a line, an artificial line, a sending relay, a receiving relay having a first winding in the line, a second winding in the artificial line, and a third winding, two transformers, a tuned circuit in the line including the primary winding of one of said transformers, and a tuned circuit in the artificial line including the primary winding of the other of said transformers, the secondary windings of said transformers being connected in series with the third winding of the receiving relay, and said tuned circuits being anti-resonant at the frequencies of interfering alternating currents.

4. In a duplex telegraph repeater system, a line, an artificial line, a sending relay, a receiving relay having a first winding in the line, a second winding in the artificial line, and a third winding, two transformers, a tuned circuit in the line including the primary winding of one of said transformers, and a tuned circuit in the artificial line including the primary winding of the other of said transformers, the secondary windings of said transformers being connected in series with the third winding of the receiving relay and the primary windings thereof being connected differentially with respect to signals sent to the line by the sending relay, said tuned circuits being anti-resonant at the frequencies of interfering alternating currents.

In testimony whereof, I have signed my name to this specification this 24th day of June, 1926.

SAMUEL I. CORY.